(12) United States Patent
Zhang

(10) Patent No.: US 12,511,827 B2
(45) Date of Patent: Dec. 30, 2025

(54) INTERACTIVE METHOD AND APPARATUS BASED ON VIRTUAL SCENE, DEVICE, AND MEDIUM

(71) Applicant: TENCENT TECHNOLOGY (SHENZHEN) COMPANY LIMITED, Shenzhen (CN)

(72) Inventor: Chong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 278 days.

(21) Appl. No.: 18/299,772

(22) Filed: Apr. 13, 2023

(65) Prior Publication Data

US 2023/0245385 A1 Aug. 3, 2023

Related U.S. Application Data

(63) Continuation of application No. PCT/CN2022/092190, filed on May 11, 2022.

(30) Foreign Application Priority Data

Jun. 24, 2021 (CN) .......................... 202110703616.5

(51) Int. Cl.
*G06T 17/00* (2006.01)
*G06T 7/194* (2017.01)
(Continued)

(52) U.S. Cl.
CPC .............. *G06T 17/00* (2013.01); *G06T 7/194* (2017.01); *G06T 7/20* (2013.01); *G06T 7/70* (2017.01);
(Continued)

(58) Field of Classification Search
CPC ........... G06T 17/00; G06T 7/194; G06T 7/20; G06T 7/70; G06T 13/20; G06V 10/25; G06V 2201/07; G06F 3/011; H04N 9/75
See application file for complete search history.

(56) References Cited

U.S. PATENT DOCUMENTS 10,796,489 B1 * 10/2020 Cordes .................. A63F 13/213
10,943,395 B1 * 3/2021 Green .................... G06F 3/0346
(Continued)

FOREIGN PATENT DOCUMENTS

| CN | 106792246 A | 5/2017 |
|---|---|---|
| CN | 111050189 A | 4/2020 |

(Continued)

OTHER PUBLICATIONS

The World Intellectual Property Organization (WIPO) International Search Report for PCT/CN2022/092190 Aug. 10, 2022 12 Pages (including translation).

*Primary Examiner* — Said Broome
*Assistant Examiner* — Jordan Wan Yick
(74) *Attorney, Agent, or Firm* — Anova Law Group, PLLC

(57) ABSTRACT

An interactive method and apparatus based on a virtual scene includes: receiving a virtual scene displaying operation; collecting a first scene image through a first camera coupled to a first terminal; and displaying a virtual environment picture, wherein the virtual environment picture includes a virtual scene and a matting object, the matting object copies a movement of a first object cutout from the first scene image and a movement of a second object cutout from a second scene image, where the second scene image is an image collected by a second camera coupled to a second terminal.

19 Claims, 10 Drawing Sheets

(51) Int. Cl.
*G06T 7/20* (2017.01)
*G06T 7/70* (2017.01)
*G06T 13/20* (2011.01)
*G06V 10/25* (2022.01)

(52) U.S. Cl.
CPC .............. *G06T 13/20* (2013.01); *G06V 10/25* (2022.01); *G06V 2201/07* (2022.01)

(56) References Cited

U.S. PATENT DOCUMENTS

| | | | |
|---|---|---|---|
| 11,004,209 B2* | 5/2021 | Chen | G06V 10/82 |
| 2016/0284134 A1 | 9/2016 | Kamhi et al. | |
| 2020/0005538 A1* | 1/2020 | Neeter | H04L 65/4015 |
| 2022/0070239 A1* | 3/2022 | Yerli | H04L 65/4015 |

FOREIGN PATENT DOCUMENTS

| | | | |
|---|---|---|---|
| CN | 112044068 A | 12/2020 | |
| CN | 112148197 A | 12/2020 | |
| CN | 113244616 A | 8/2021 | |

\* cited by examiner

INTERACTIVE METHOD AND APPARATUS BASED ON VIRTUAL SCENE, DEVICE, AND MEDIUM

CROSS-REFERENCES TO RELATED APPLICATIONS

This application is a continuation application of PCT Patent Application No. PCT/CN2022/092190, entitled "VIRTUAL SCENE-BASED INTERACTION METHOD AND APPARATUS, DEVICE, MEDIUM, AND PROGRAM PRODUCT" and filed on May 11, 2022, which claims priority to Chinese Patent Application No. 202110703616.5, entitled "INTERACTIVE METHOD AND APPARATUS BASED ON VIRTUAL SCENE, DEVICE AND READABLE STORAGE MEDIUM", filed on Jun. 24, 2021, the entire contents of both of which are incorporated herein by reference.

FIELD OF THE TECHNOLOGY

Embodiments of the present disclosure relate to the field of virtual environments, in particular to an interactive method and apparatus based on a virtual scene, a device, a medium and a program product.

BACKGROUND OF THE DISCLOSURE

An application program based on a virtual scene usually runs based on a virtual environment built through a three-dimensional model. When the application program runs, a player can interact with the virtual environment by controlling a virtual object to move in the virtual environment.

In related technologies, the player may control the virtual object in the virtual environment through a touch display screen or by inputting a control signal through an external input device, and the virtual object moves in the virtual environment under the control of the player.

However, an interactive process realized by the above methods stays in the interactive process of the virtual object in the virtual environment, the interactive process is relatively monotonous, the player needs to control the virtual object to complete interaction, and the interaction implementation process is relatively complicated.

SUMMARY

Embodiments of the present disclosure provide an interactive method and apparatus based on a virtual scene, a device, a medium and a program product, which can improve diversity and efficiency of interaction between a player and a virtual environment. The technical solutions are as follows:

In one aspect, an interactive method based on a virtual scene is provided, and the method is executed by a first terminal, and includes: receiving a virtual scene displaying operation; collecting a first scene image through a first camera coupled to the first terminal, the first scene image including a first object, and the first object being located within a shoot range of the first camera; and displaying a virtual environment picture showing displaying the virtual scene, the virtual scene including a matting object. The matting object copies a movement of the first object cutout from the first scene image and a movement of a second object cutout from a second scene image, and the second scene image being an image collected by a camera coupled to a second terminal.

In another aspect, an interactive apparatus based on a virtual scene is provided, and includes a processor and a memory, the memory storing at least one program, and the at least one program being loaded and executed by the processor to implement: receiving a virtual scene displaying operation; collecting a first scene image through a first camera coupled to a first terminal, the first scene image comprising a first object, and the first object being located within a shoot range of the first camera; and displaying a virtual environment picture showing the virtual scene, the virtual scene comprising a matting object, the matting object copying a movement the first object cutout from the first scene image and a movement of the second object cutout from a second scene image, and the second scene image being an image collected by a second camera coupled to a second terminal.

In another aspect, a non-transitory computer-readable storage medium is provided, the computer-readable storage medium storing at least one program, and the at least one program being loaded and executed by a processor to implement any above interactive method based on the virtual scene described in the embodiment of the present disclosure.

In another aspect, a computer program product is provided, the computer program product including computer instructions, and the computer instructions being stored in a computer-readable storage medium. A processor of the computer device reads the computer instructions from the computer-readable storage medium, and the processor executes the computer instructions, such that the computer device executes any interactive method based on the virtual scene described in the above embodiment.

The technical solutions provided in the embodiments of the present disclosure at least include the following beneficial effects:

in a process of displaying the virtual scene, the first object and the second object are added and displayed in the virtual scene, where the first object and the second object are cutout from the scene images collected by the cameras, that is, real people and objects are combined with the virtual scene, so that the real people and objects can interact directly with the virtual scene without interacting with the virtual scene in a form of a virtual object, which improves diversity of interaction between the virtual scene and a user, a player does not need to control the virtual object to interact with the virtual scene, and an interaction efficiency is improved. At the same time, when an object is added to the virtual scene, since the real people and objects are collected directly through the camera to add the object to the virtual scene without performing data modeling for a new object, resource consumption during model data generation is reduced, and resource consumption during model data storage is reduced.

DESCRIPTION OF EMBODIMENTS

First, terms involved in embodiments of the present disclosure are briefly introduced.

Virtual environment: a virtual environment displayed (or provided) when an application program runs on a terminal. The virtual environment may be a simulation environment of a real world, a semi-simulation and a semi-fiction environment, or a pure-fiction environment. The virtual environment may be any one of a two-dimensional virtual environment, a 2.5-dimensional virtual environment and a three-dimensional virtual environment, which is limited in the present disclosure. The following embodiments take the virtual environment being the three-dimensional virtual environment as an example for illustration. In the embodiments of the present disclosure, the virtual environment is also called a virtual scene.

Figure 1:
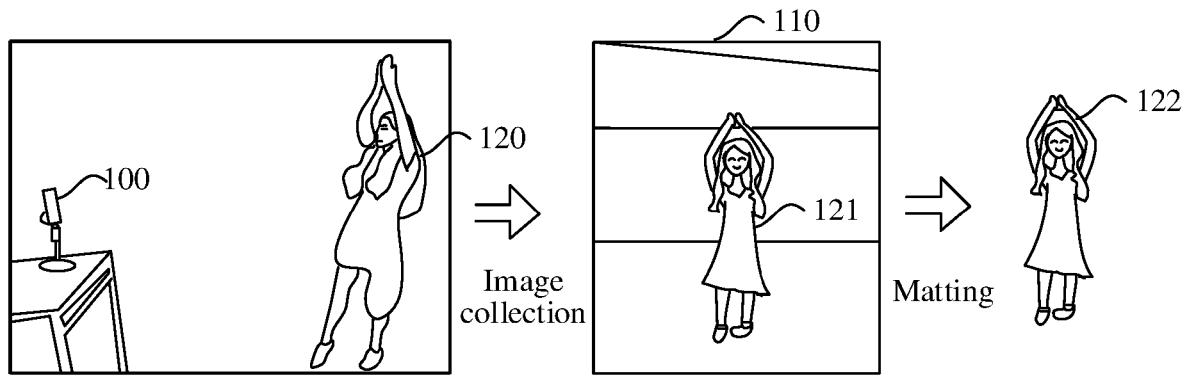
FIG. 1 is a schematic diagram of a matting object generation process provided by an exemplary embodiment of the present disclosure.

Matting object: a specified object cutout from a scene image after the scene image is collected by a real-scene camera. Schematically, in the embodiments of the present disclosure, the matting object being obtained by matting a portrait in the scene image (e.g., the matting object being a portrait cutout from the scene image) is taken as an example for illustration. Schematically, please refer to FIG. 1, FIG. 1 shows a schematic diagram of a matting object generation process provided by an exemplary embodiment of the present disclosure, as shown in FIG. 1, image collection is performed on a scene through a real-scene camera 100 to obtain a scene image 110, where an image collection range of the real-scene camera 100 includes a person 120, so that the scene image 110 includes a corresponding object 121, and a matting object 122 is obtained by matting the object 121 from the scene image 110.

In the embodiments of the present disclosure, the virtual scene and the matting object in the virtual scene are displayed in a virtual environment picture, so that interactive experience of players themselves in the virtual scene is created.

The terminal in the present disclosure may be a desktop computer, a laptop portable computer, a mobile phone, a tablet computer, an ebook reader, a moving picture experts group audio layer III (MP3) player, a moving picture experts group audio layer IV (MP4) player, a vehicle-mounted terminal, an aircraft or the like. An application program supporting the virtual environment is installed and runs in the terminal, such as an application program supporting the three-dimensional virtual environment. The application program may be any one of a virtual reality application program, a three-dimensional map program, a third-person shooting (TPS) game, a first-person shooting (FPS) game, or multiplayer online battle arena (MOBA) games. In some embodiments, the application program may be a stand-alone application program, such as a stand-alone three-dimensional game program, or a network online application program.

Figure 2:
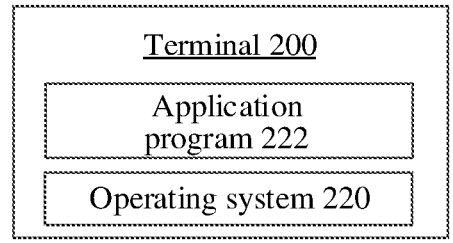
FIG. 2 is a structural block diagram of an electronic device provided by an exemplary embodiment of the present disclosure.

FIG. 2 shows a structural block diagram of an electronic device provided by an exemplary embodiment of the present disclosure. The electronic device 200 includes: an operating system 220 and an application program 222.

The operating system 220 is basic software that provides secure access to computer hardware for the application program 222.

The application program 222 is an application program that supports the virtual environment. In some embodiments, the application program 222 is an application program that supports the three-dimensional virtual environment. The application program 222 may be any one of a virtual reality application program, a three-dimensional map program, a TPS game, an FPS game, MOBA games or multiplayer gunbattle survival games. The application program 222 may be a stand-alone application program, such as a stand-alone three-dimensional game program, or a network online application program.

Figure 3:
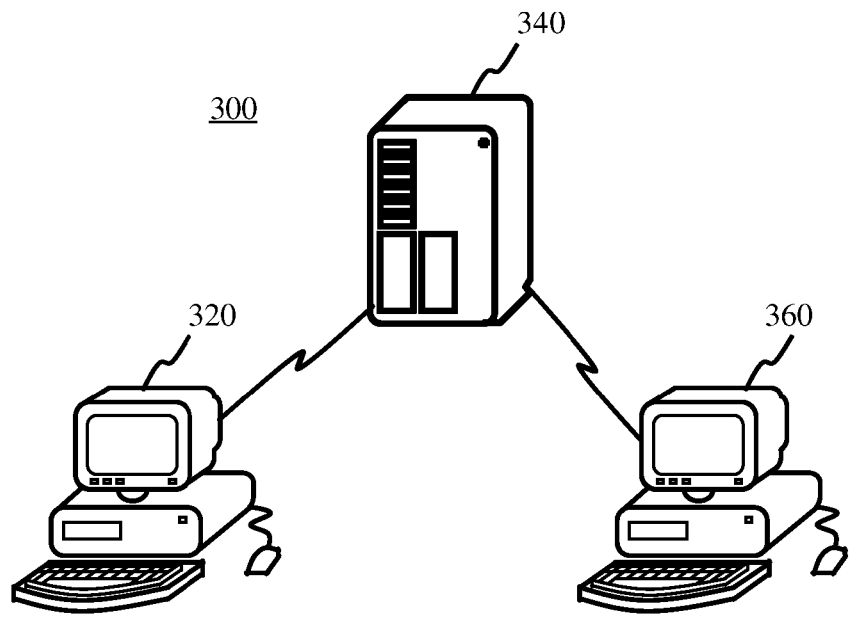
FIG. 3 is a schematic diagram of an implementation environment provided by an exemplary embodiment of the present disclosure.

FIG. 3 shows a structural block diagram of a computer system provided by an exemplary embodiment of the present disclosure. A computer system 300 includes: a first device 320, a server 340 and a second device 360.

An application program that supports the virtual environment is installed and runs on the first device 320. The application program may be any one of a virtual reality application program, a three-dimensional map program, a TPS game, an FPS game, MOBA games or multiplayer gunbattle survival games. The first device 320 is a device used by a first user, the first user uses the first device 320 to control activity of a first matting object in the virtual environment, where the first device 320 is configured with a first camera, and after the first camera performs image collection on the first user or other users within the image collection range and matting is performed, the first matting object is displayed in the virtual environment.

The first device 320 is connected to the server 340 by using a wireless network or a wired network.

The server 340 includes at least one of a server, multiple servers, a cloud computing platform or a virtualization center. The server 340 is configured to provide background services for the application program that supports the three-dimensional virtual environment. In some embodiments, the server 340 undertakes a main computing work, and the first device 320 and the second device 360 undertake a secondary computing work; or, the server 340 undertakes the secondary computing work, and the first device 320 and the second device 360 undertake the main computing work; or, the server 340, the first device 320 and the second device 360 adopt a distributed computing architecture for collaborative computing.

An application program that supports the virtual environment is installed and runs on the second device 360. The second device 360 is a device used by a second user, the second user uses the second device 360 to control activity of a second matting object in the virtual environment, where the second device 360 is configured with a second camera, and after the second camera performs image collection on the second user or other users within the image collection range and matting is performed, the second matting object is displayed in the virtual environment.

In some embodiments, the first matting object and the second matting object are located in the same virtual environment. In some embodiments, the first matting object and the second matting object may belong to the same team and the same organization, have a friend relationship or have temporary communication permissions. In some embodiments, the first matting object and the second matting object may also belong to different teams, different organizations, or two groups with hostility.

In some embodiments, the application programs installed on the first device 320 and the second device 360 are the same, or the application programs installed on the two devices are the same type of application programs on different control system platforms. The first device 320 may generally refer to one of a plurality of devices, the second device 360 may generally refer to one of the plurality of devices, and the embodiment only takes the first device 320 and the second device 360 as examples for illustration. The device type of the first device 320 and the second device 360 are the same or different, and the device type includes: at least one of a game host, a desktop computer, a smart phone, a tablet computer, an e-book reader, an MP3 player, an MP4 player, a laptop portable computer, a vehicle-mounted terminal or an aircraft. The following embodiments take the device being the desktop computer as an example for illustration.

A person skilled in the art may know that the quantity of the above devices may be more or less. For example, the above device may be only one, or dozens or hundreds, or more. The embodiments of the present disclosure do not limit the quantity and device type of the device.

The above server 340 may be implemented as a physical server or a cloud server of a cloud, where a cloud technology refers to a hosting technology that unifies a series of resources of hardware, software, networks and the like in a wide area network or a local area network to realize data computing, storage, processing and sharing.

In some embodiments, the method provided by the embodiments of the present disclosure may be applied to a cloud game scene, so that computing of data logic in a game process is completed through the cloud server, and a terminal is responsible for the display of a game interface.

In some embodiments, the above server 340 may further be implemented as a node in a blockchain system. Blockchain is a new application mode of distributed data storage, point-to-point transmission, consensus mechanism, encryption algorithm and other computer technologies.

An application scenario of the embodiments of the present disclosure includes at least one of the following scenes:

first, it is applied to a game scene, where a game may be implemented as a cloud game, that is, computing logic in the game process is completed through a cloud server, and a terminal is configured to complete display logic in the game process.

Schematically, the game may be implemented as at least one of a dance game, a shooting game or a puzzle game. A player A collects a scene image through a first terminal configured with a first camera, and obtains a matting object a corresponding to the player A by matting the scene image; and a player B collects a scene image through a second terminal configured with a second camera, and obtains a matting object b corresponding to the player B by matting the scene image. The matting object a, the matting object b and a preset virtual scene are displayed in a terminal interface, so that a process of the player A and the player B interacting in the virtual scene and participating in the game is realized.

Second, it is applied to a livestreaming scene, where a livestreaming application program includes an anchor and viewers, the anchor refers to a user who creates a livestreaming room, and the viewers refer to users who watch the livestreaming room. In the livestreaming room, the viewers can interact with the viewers in the virtual scene, or the anchor can interact with the viewers in the virtual scene.

Schematically, the anchor 1 creates a virtual scene interaction activity in the livestreaming room and invites the viewers to participate in the virtual scene interaction activity, a viewer 2 is invited to participate in the virtual scene interaction activity with the anchor 1, the anchor 1 collects a scene image through a first terminal configured with a first camera, and obtains a matting object m corresponding to the anchor 1 by matting the scene image; and the viewer 2 collects a scene image through a second terminal configured with a second camera, and obtains a matting object n corresponding to the viewer 2 by matting the scene image. The matting object m, the matting object n and the preset virtual scene are displayed in a terminal interface, so that interaction between the anchor 1 and the viewer 2 in the virtual scene is realized. The viewers other than the viewer 2 can watch an interactive process of the anchor 1 and the viewer 2 in the virtual scene.

Figure 4:
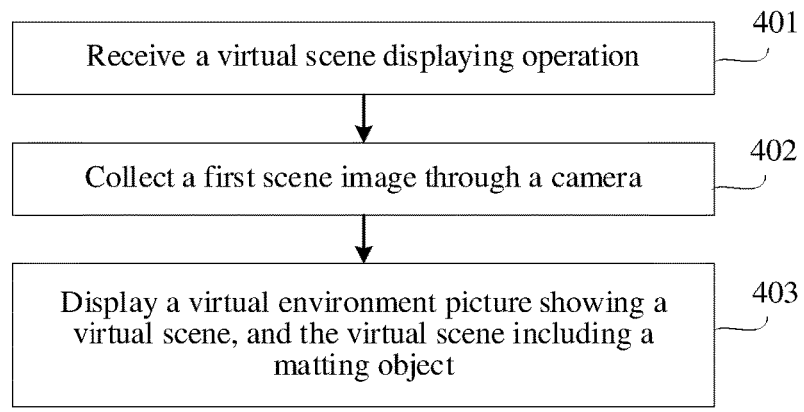
FIG. 4 is a flowchart of an interactive method based on a virtual scene provided by an exemplary embodiment of the present disclosure.

With reference to the brief introduction of the above terms and the description of the implementation environment, the interactive method based on the virtual scene provided in the embodiments of the present disclosure is illustrated. Please refer to FIG. 4, which shows a flowchart of an interactive method based on a virtual scene provided by an exemplary embodiment of the present disclosure, a situation that the method is executed by a first terminal configured with a camera is taken as an example for illustration, and as shown in FIG. 4, the method includes:

Step S401: Receive a virtual scene displaying operation.

In some embodiments, the virtual scene displaying operation refers to an operation that a user indicates to open a virtual scene.

Schematically, as for different application scenarios, an implementation mode of the virtual scene displaying operation includes at least one of the following modes:

first, as for a cloud game application scenario, a user triggers a game starting operation as the virtual scene displaying operation, that is, a cloud game match is started according to the game starting operation, and it enters a game interface. The user may form a team with friends to enter the cloud game match, or invite the friends to form a team after entering the cloud game match.

Second, as for a livestreaming application scenario, an anchor account triggers an interactive space opening operation as the virtual scene displaying operation, that is, a virtual scene where the anchor account interacts with viewer accounts is opened according to the interactive space opening operation.

Schematically, a player opens a link of live game on a smart device, at the same time, a camera device is fixed in front of a display, and it is ensured that a specified part or a whole body of the player is within a framing range of the camera.

In some embodiments, a camera configured on the first terminal is a two-dimensional camera, that is, the camera is configured to collect a plane image. Or, a camera configured on the first terminal is a three-dimensional camera, that is, depth-of-field information is collected in a process of image collection.

When the camera configured on the first terminal is the two-dimensional camera, data interaction between the terminal and the server is data interaction based on the plane image, and the amount of data interaction is reduced; and when the camera configured on the first terminal is the three-dimensional camera, the terminal can build a three-dimensional model corresponding to the player according to the collected depth-of-field information, and the lifelikeness of the matting object displayed in the virtual scene is improved.

Step S402: Collect a first scene image through the camera (e.g., first camera coupled to the first terminal).

The first scene image includes a first object located within a shoot range of the first camera of the first terminal. That is, the first scene image refers to an image collected by the camera configured on the first terminal, where the first terminal successively collects the first scene image in a form of video stream, and in a collection process of the first scene image, the first object is located within the shoot range of the camera and displayed in the first scene image.

In some embodiments, when the first terminal receives the virtual scene displaying operation, the camera is turned on, and the first scene image is collected through the camera. That is, in a process of displaying the virtual scene after receiving the virtual scene displaying operation, the camera may be immediately turned on to collect the first scene image.

In some other embodiments, after the first terminal receives the virtual scene displaying operation, the virtual environment picture is displayed, at the moment, there is no virtual matting object in the virtual environment picture, or there are only matting objects other than the first object corresponding to the first terminal. In response to receiving an add operation, the camera is turned on to collect the first scene image.

After the first scene image is collected, matting processing further needs to be performed on the first scene image, the first object is cutout from the first scene image, and the above first object is a real person or object displayed in the first scene image. In some embodiments, the above first object is a first object in the first scene image determined by performing, by the server, object recognition on the first scene image after the first terminal uploads the first scene image to the server; or, a recognition process of the above first object may also be implemented by the first terminal, which is not limited here.

In some embodiments, when the first scene image includes a plurality of objects, a plurality of candidate objects are displayed after object recognition performed by the first terminal or the server, and the first terminal determines the first object from the candidate objects by receiving an object selection operation. In some embodiments, the first object determined from the plurality of above candidate objects may be one or more.

A process of matting the first scene image may be completed by the terminal or the server, when the process of matting the first scene image is completed by the terminal, and after the camera collects the first scene image, matting processing is directly performed on the first scene image, so that the amount of data interaction between the terminal and the server is saved; and when the process of matting the first scene image is completed by the server, after the camera collects the first scene image, the first scene image is transmitted to the server, and the first object is cutout from the first scene image through the server.

In some embodiments, before turning on the camera to obtain the first scene image, the terminal needs to obtain user's authorization for an application program to collect the first scene image through the camera, that is, authorization tips information is displayed. The authorization tips information includes tips information for enabling the camera and tips information for a use purpose of the scene image collected by the camera, and in response to the authorization tips information, a confirmation operation is received, the terminal turns on the camera.

Step S403: Display a virtual environment picture showing the virtual scene, and the virtual scene including a matting object.

The matting object includes a first object cutout from the first scene image, and a second object cutout from a second scene image. Further, the matting object copies movements of the first object and the second object. The first object is a real person or object displayed in the first scene image, and the second object is a real person or object displayed in the second scene image. In some embodiments, the first object and the second object may be different persons or objects in reality shot by the different cameras, or the same person or object in reality shot by the different cameras. Schematically, the first object and the second object obtained by matting are added to the virtual scene as the matting objects, and the first terminal displays the virtual environment picture according to the virtual scene.

The first scene image is an image collected by the first terminal configured with a camera, and the second scene image is an image collected by the second terminal configured with a camera. A first scene is a scene shot by the first terminal through the camera, and the second scene is a scene shot by the second terminal through the camera. In some embodiments, the first scene and the second scene may be different real scenes shot by the different cameras, or the same real scene shot by the different cameras.

The above virtual scene is a scene built by an application program, the virtual scene may be a two-dimensional animation scene or a three-dimensional animation scene, and may also be a scene obtained by computer simulation reality, that is, the virtual scene is a scene obtained by fiction of a computer, and the above first scene and second scene are the real scenes shot by the cameras.

Schematically, the above virtual scene may be a scene composed of the matting object and a virtual element together, where the above virtual element includes at least one of a virtual environment, a virtual object or a virtual prop. The above virtual object is a fictional object in the virtual scene, and the matting object is an object for displaying a real person or object in reality in the virtual scene.

The first object and the second object are objects that participate in the same virtual match or virtual room together. The embodiment takes the virtual scene including the first object and the second object as an example for illustration, in some embodiments, the virtual scene may also only include one object, or three or more than three objects, which is not limited in the embodiment.

In some embodiments, among the matting objects displayed in the virtual environment picture, the corresponding display quantity of the objects cutout from the same scene image may be single or multiple, that is, the user may set the quantity of the self-matting objects mapped to the virtual scene. In an example, a target account logs in the first terminal, the first terminal receives an object quantity setting operation indicated by the target account, where a display quantity indicated by the object quantity setting operation is a target quantity, and the first terminal displays the target quantity of first objects in the virtual environment picture according to the object quantity setting operation. For example, the target quantity indicated by the object quantity setting operation indicated by the first terminal is three, the target quantity indicated by the object quantity setting operation indicated by the second terminal is two, a first object A1, a first object A2 and a first object A3 cutout from the first scene image, and a second object B1 and a second object B2 cutout from the second scene image are displayed in the virtual environment picture, where the first object A1, the first object A2 and the first object A3 are objects with the same image, and the second object B1 and the second object B2 are objects with the same image.

The embodiment takes the server performing matting on the scene image as an example for illustration, the terminal transmits the first scene image to the server and receives picture display data fed back by the server, and the picture display data includes scene data corresponding to the virtual scene and object data corresponding to the matting object. When in the virtual scene, there are matting objects that are cutout from the scene images provided by a plurality of different terminals, the servers obtains the scene images collected by the terminals, and the object data is cutout from the scene images, so that the picture display data corresponding to the same virtual scene is uniformly configured for the plurality of different terminals, which can reduce the waste of processing resources. At the same time, since there is no need for the terminals to perform local matting processing, difference caused by different hardware conditions when matting the scene images is avoided, and the uniformity of the terminals displaying the same virtual scene when displaying the picture is ensured.

The scene data of the virtual scene is data corresponding to the virtual scene and determined according to a preset virtual scene; or, the scene data is data corresponding to a selection result determined according to a user's selection of the virtual scene, which provides a solution of the user's selection for the virtual scene, and increases the diversity in the virtual scene interaction; or, the scene data is data corresponding to a random result and determined according to the virtual scene obtained randomly. This is not limited in the embodiment.

The terminal displays the virtual environment picture based on the scene data and the object data fed back by the server.

In some embodiments, display positions of the first object and the second object in the virtual scene are determined randomly in preset candidate positions, so that uncertainty of the object display is increased; or, the display positions of the first object and the second object in the virtual scene are indicated by the server to the terminal according to a preset display rule; or, the display positions of the first object and the second object in the virtual scene are indicated by the user through the first terminal and the second terminal respectively, that is, the display position of the matting object in the virtual scene is set by the user himself In some embodiments, the display positions of the first object and the second object in the virtual scene may be fixed or change with the change of position indication.

Schematically, the object data includes an object display position, the virtual scene is displayed based on the scene data, and the matting object is displayed at the object display position in the virtual scene. In some embodiments, the above object data may be data configured for the terminal after the server receives the virtual scene displaying operation and obtains the scene image, that is, the server performs matting on the scene images obtained from different terminals to obtain the matting objects, and configures the display positions of the matting objects to obtain the object data, and the above object data is transmitted to each terminal. Since when the terminals in the same virtual scene display the virtual environment picture, contents of the virtual environment contained in the displayed virtual environment picture are the same or similar, when configuring the object data, the server uniformly configures the plurality of terminals, an efficiency during object data configuration can be improved, and meanwhile resource consumption during object data configuration is reduced.

The object data includes first object data corresponding to the first object and second object data corresponding to the second object, the first object data includes a first object display position, the second object data includes a second object display position, so that the first object is displayed at a corresponding position in the virtual scene according to the first object display position, and the second object is displayed at a corresponding position in the virtual scene according to the second object display position.

The object display position is implemented in a form of coordinates, that is, the display position of the matting object is indicated in a way that a specified identification point of the matting object is at the object display position. Schematically, the display position of the matting object is indicated in a way that a central point of a minimum bounding box of the matting object coincides with the object display position.

In some embodiments, a display size of the matting object is related to a display size of the matting object in the scene image, that is, the closer a player is to the camera, the larger an object display region corresponding to the player in the collected scene image is, and the larger the display size of the matting object obtained by matting is; or, in some other embodiments, the display size of the matting object is obtained through adjustment by the server according to the size obtained by matting and according to a preset size requirement, that is, after obtaining the matting object by matting the obtained scene image, the server unifies the display size of the matting object in the same virtual scene, so as to ensure the rationality of the display of the matting object in the virtual scene; or, in some other embodiments, the display size of the matting object may also be determined by a size adjusting operation indicated by the terminal corresponding to the matting object. In one example, the user may input the size adjusting operation through the first device to adjust a display size of the first object.

Figure 5:
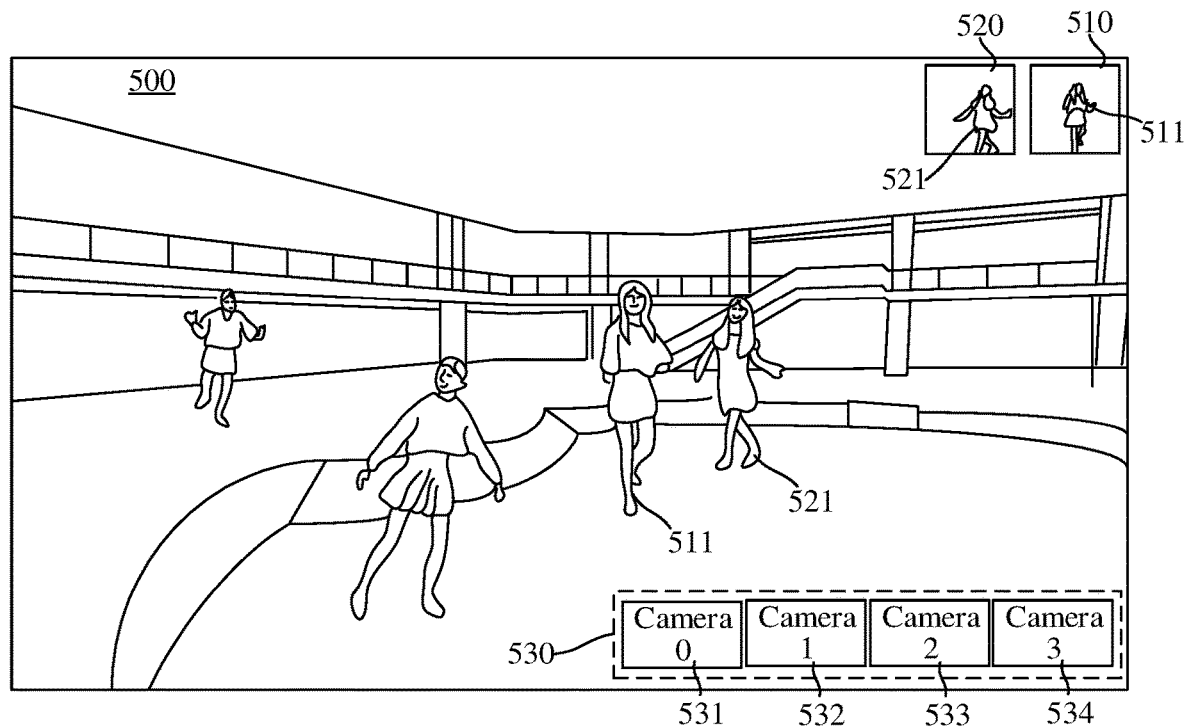
FIG. 5 is a schematic diagram of an interface of a virtual environment picture provided based on the embodiment shown in FIG. 4.

In some embodiments, the scene images are further displayed on the virtual environment picture in a superimposed mode, for example, a first scene image and a second scene image are displayed at an upper right corner of the virtual environment picture in a superimposed mode. Schematically, FIG. 5 is a schematic diagram of an interface of a virtual environment picture provided by an exemplary embodiment of the present disclosure. As shown in FIG. 5, a first scene image 510 and a second scene image 520 are displayed on a virtual environment picture 500 in a superimposed mode, the first scene image 510 includes a first object 511 corresponding to the first object 511 displayed in the virtual environment picture 500, that is, the first object 511 displayed in the virtual environment picture 500 is cutout from the first scene image 510; and the second scene image 520 includes a second object 521 corresponding to the second object 521 displayed in the virtual environment picture 500, that is, the second object 521 displayed in the virtual environment picture 500 is cutout from the second scene image 520.

In some embodiments, an angle for observing the virtual scene can be adjusted. The target account in the virtual scene corresponds to a camera model for observing the virtual scene; or, the target account in the virtual scene corresponds to a plurality of camera models for observing the virtual scene. The above target account is an account to log in an application program providing the virtual scene in the current terminal.

When the target account can only control one camera model in the virtual scene, and when an observation angle needs to be adjusted, an observation position, an observation focal length and an observation angle of the camera model in the virtual scene are adjusted. Schematically, as shown in FIG. 5, a camera model identifier 530 is further displayed on the virtual environment picture 500, and includes a first camera model 531, a second camera model 532, a third camera model 533 and a fourth camera model 534. When the target account corresponds to one camera model, taking the target account corresponding to the first camera model 531 as an example, the second camera model 532, the third camera model 533 and the fourth camera model 534 are camera models adopted by other accounts participating in the virtual scene to observe and render the virtual scene. When the target account needs to adjust an angle for observing the virtual scene, an observation position of the first camera model 531 in the virtual scene is adjusted; or, an observation focal length of the first camera model 531 in the virtual scene is adjusted; or, an observation angle of the first camera model 531 in the virtual scene is adjusted.

When the target account can control a plurality of camera models in the virtual scene, and when the observation angle needs to be adjusted, switching is performed among the camera models for observing the virtual environment. That is, a viewing angle adjusting operation is received, based on the viewing angle adjusting operation, a first observation angle for observing the virtual scene and the matting object is adjusted to a second observation angle, where the first observation angle corresponds to the first camera model in the virtual scene, and the second observation angle corresponds to the second camera model in the virtual scene. In some embodiments, a camera model corresponding to the target account in the virtual scene is determined, the camera model at least includes a first camera model and a second camera model, the first camera model is a camera model currently used for observing the virtual scene, based on the viewing angle adjusting operation, the first camera model for observing the virtual scene is switched to the second camera model, and the virtual scene is observed and rendered at the second observation angle. The first observation angle of the first camera model is different from the second observation angle of the second camera model. That is, a switching function of observation viewing angles is provided in a way that the camera models are in one-to-one correspondence with the observation viewing angles, which camera model being enabled to provide the displayed virtual environment picture can be quickly determined through the viewing angle adjusting operation, and thus a picture switching efficiency during observation viewing angle switching is improved. The accounts and the camera models are bound to realize that when the viewing angle is adjusted, the camera models can be allocated according to an observation permission of the account on the virtual scene, so that the virtual environment picture is prevented from displaying illegal contents.

Schematically, as shown in FIG. 5, a camera model identifier 530 is further displayed on the virtual environment picture 500, and includes a first camera model 531, a second camera model 532, a third camera model 533 and a fourth camera model 534. When the target account corresponds to a plurality of camera models, schematically, the first camera model 531, the second camera model 532, the third camera model 533 and the fourth camera model 534 are camera models corresponding to the target account in the virtual scene. Schematically, the target account observes the virtual scene currently through the first camera model 531, when the target account needs to adjust the angle for observing the virtual scene, based on the viewing angle adjusting operation, the first camera model 531 is switched to the second camera model 532, and the virtual scene and the matting object are observed through the second camera model 532 and the virtual scene is rendered based on the second camera model 532.

In some embodiments, when the angle for observing the virtual scene is adjusted, a display direction of the matting object is adjusted in real time according to angle change to keep the matting object being displayed facing the observation angle.

To sum up, according to the method provided by the embodiments of the present disclosure, in the process of displaying the virtual scene, the first object and the second object are added and displayed in the virtual scene, where the first object and the second object are cutout from the scene image collected by the camera, that is, real people and objects are combined with the virtual scene, so that the real people and objects can interact directly with the virtual scene without interacting with the virtual scene in a form of the virtual object, which improves diversity of interaction between the virtual scene and the user, the player does not need to control the virtual object to interact with the virtual scene, and the interaction efficiency is improved. At the same time, when an object is added to the virtual scene, since the real people and objects are collected directly through the camera to add the object to the virtual scene without performing data modeling for a new object, resource consumption during model data generation is reduced, and resource consumption during model data storage is reduced.

Figure 6:
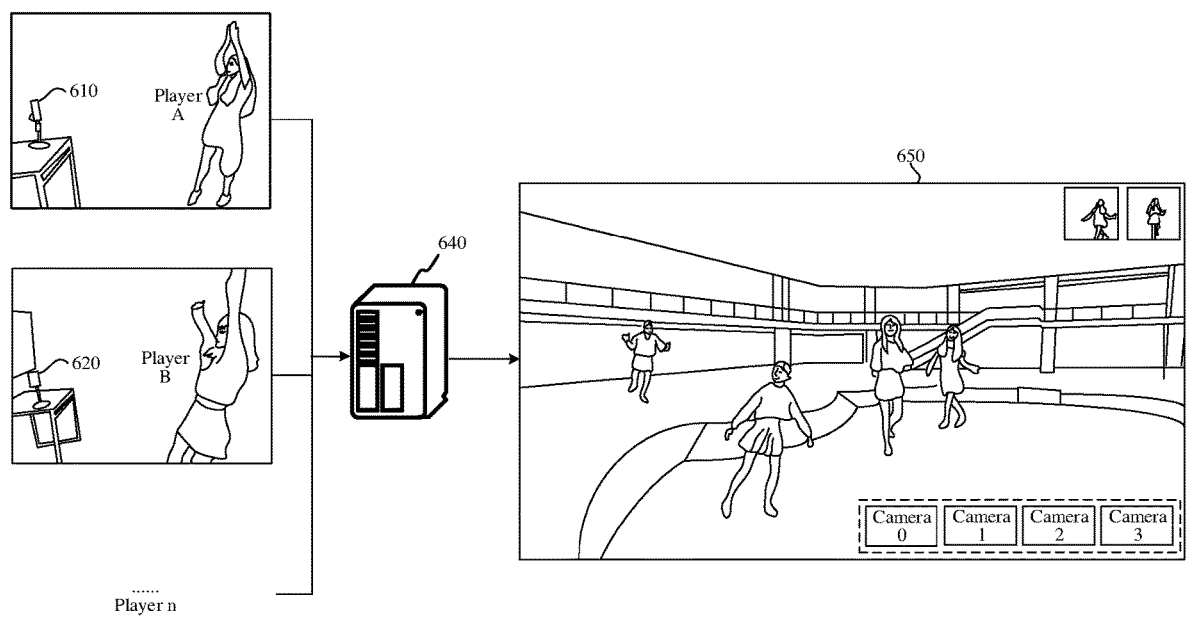
FIG. 6 is an overall schematic diagram of an implementation environment provided by an exemplary embodiment of the present disclosure.

Schematically, FIG. 6 is an overall schematic diagram of an implementation environment provided by an exemplary embodiment of the present disclosure, as shown in FIG. 6, a player A operates a smart device 610 to participate in a game, and the smart device 610 is configured with a camera to perform image collection on the player A; and a player B operates a smart device 620 to participate in the game, and the smart device 620 is configured with a camera to perform image collection on the player B. A server 640 receives collected scene images transmitted by the smart device 610 and the smart device 620, performs matting on the scene images to obtain matting objects corresponding to the player A and the player B, and feeds a virtual scene and the matting objects back to a viewing terminal 650 for display, where the smart device 610 and the smart device 620 also belong to the viewing terminal.

Figure 7:
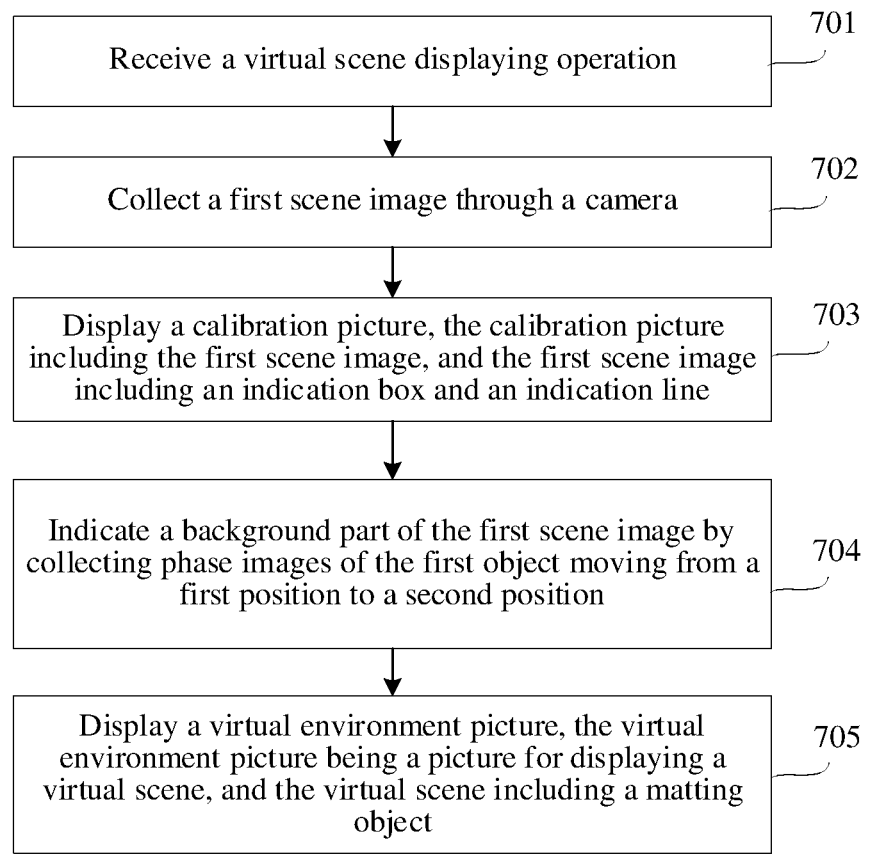
FIG. 7 is a flowchart of an interactive method based on a virtual scene provided by another exemplary embodiment of the present disclosure.

In some embodiments, a user first needs to perform picture calibration, so as to distinguish the objects from image background, and a matting accuracy of the objects is improved. FIG. 7 is a flowchart of an interactive method based on a virtual scene provided by another exemplary embodiment of the present disclosure, a situation that the method is applied to a first terminal configured with a camera is taken as an example for illustration, and as shown in FIG. 7, the method includes the following steps:

Step S701: Receive a virtual scene displaying operation.

In some embodiments, the virtual scene displaying operation refers to an operation that a user indicates to open a virtual scene.

Schematically, a player opens a link of live game on a smart device, at the same time, a camera device is fixed in front of a display, and it is ensured that a specified part or a whole body of the player is within a framing range of the camera.

Step S702: Collect a first scene image through the camera.

The first scene image includes a first object located within a shoot range of the camera of the first terminal. That is, the first scene image refers to an image collected by the camera configured on the first terminal.

Step S703: Display a calibration picture, the calibration picture including a first scene image, and the first scene image including an indication box and an indication line.

The indication box is configured to indicate a location of the first object with a selection box, and the indication line is located at a specified position of the first scene image and segments the first scene image into a first region and a second region.

Figure 8:
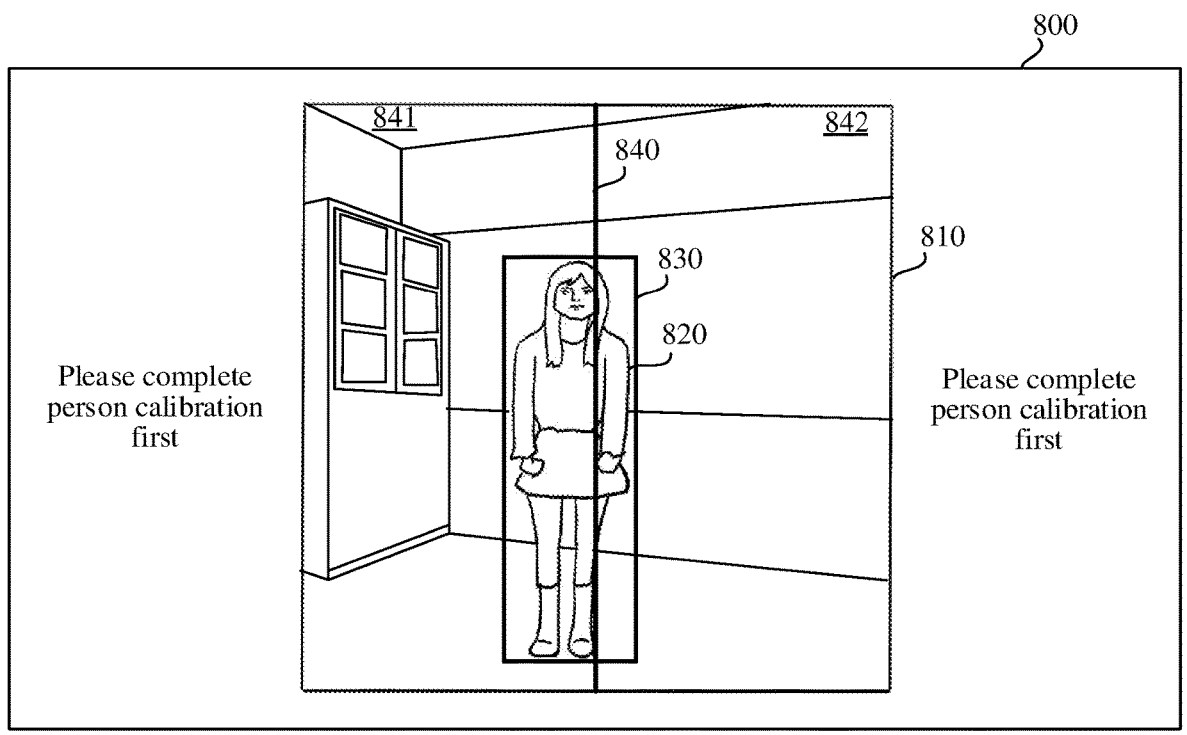
FIG. 8 is a schematic diagram of an observation angle change process provided based on the embodiment shown in FIG. 7.

Schematically, please refer to FIG. 8, which shows a schematic diagram of a calibration picture provided by an exemplary embodiment of the present disclosure. As shown in FIG. 8, a first scene image 810 is displayed in the calibration picture 800, the first scene image 810 includes a first object 820, an indication box 830 and an indication line 840, where the indication box 830 performs box selection on the first object 820 through a pre-trained object recognition model, and the indication line 840 is longitudinally displayed in the middle of the first scene image 810 to divide the first scene image 810 into a left half region 841 and a right half region 842.

In FIG. 8 above, a situation that the indication line is longitudinally displayed is taken as an example for illustration, and in some embodiments, the indication line may also be implemented to be horizontally displayed, which is not limited in the embodiment.

Step S704: Indicate a background part of the first scene image by collecting phase images of the first object moving from a first position to a second position.

The first position is a position of the indication box located in the first region, and the second position is a position of the indication box located in the second region. That is, the indication box is controlled to move from the first region of the first scene image to the second region of the first scene image, so that when the indication box is displayed in the first region, a content displayed in the second region is a complete background image; and when the indication box is displayed in the second region, a content displayed in the first region is a complete background image, the two complete background images are combined to obtain a complete background image in the first scene image except for the first object, during matting of the first object in the first scene image subsequently, a matting process can be realized according to the recognized background image, and accuracy of a matting result is improved.

Figure 9:
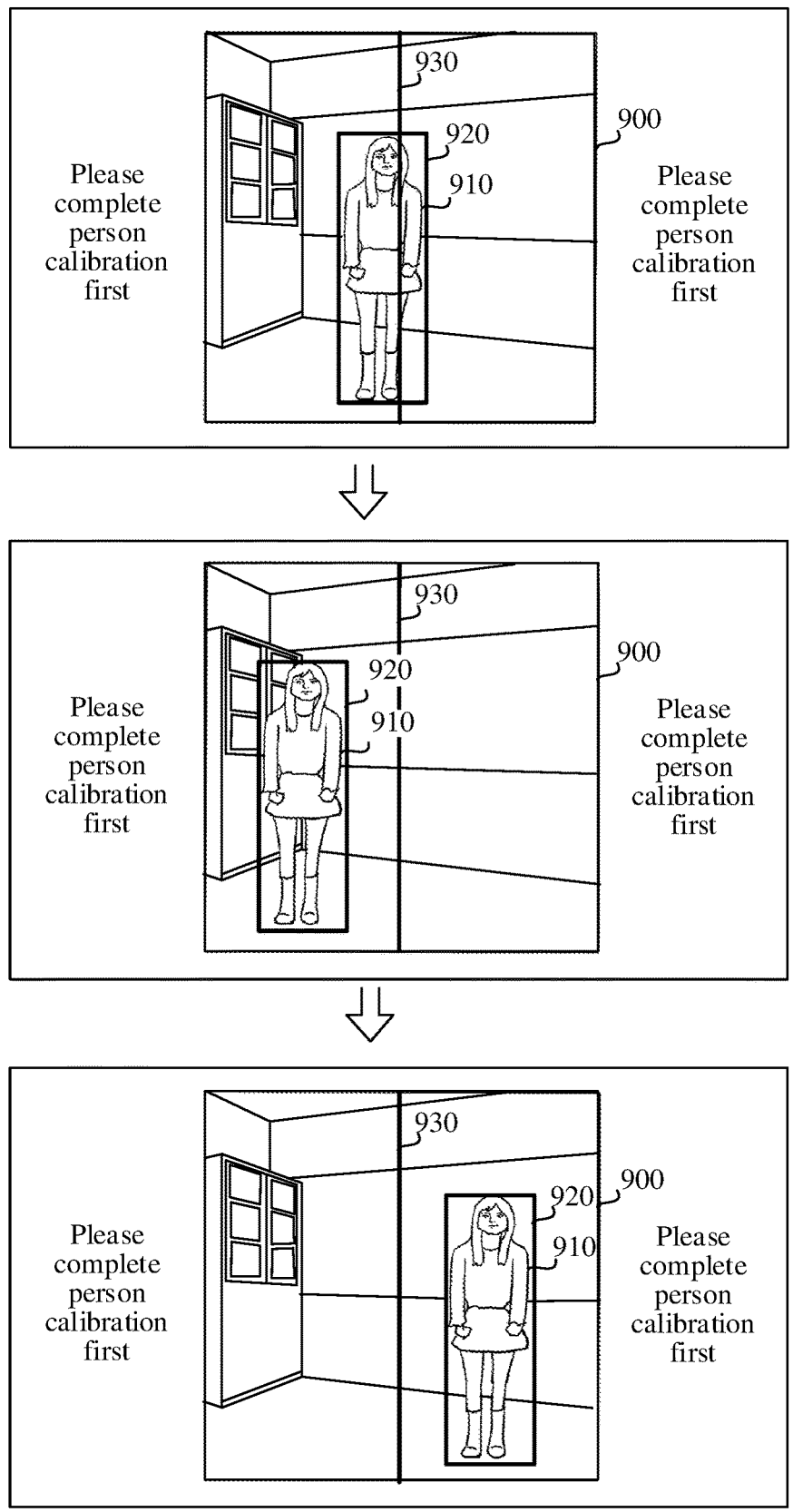
FIG. 9 is a flowchart of an interactive observation method based on a virtual scene provided by another exemplary embodiment of the present disclosure.

Schematically, please refer to FIG. 9, which shows a schematic diagram of a calibration process provided by an exemplary embodiment of the present disclosure, as shown in FIG. 9, a first object 910 is located in a middle position of a first scene image 900 at an initial moment, first, a player moves to the left, so that the first object 910 is located in a left position of the first scene image 900, and an indication box 920 is completely located on a left side of an indication line 930; and then, the player moves to the right, so that the first object 910 is located in a right position of the first scene image 900, and the indication box 920 is completely located on a right side of the indication line 930. According to an image on the right side of the indication line 930 when the indication box 920 is completely located on the left side of the indication line 930, and an image on the left side of the indication line 930 when the indication box 920 is completely located on the right side of the indication line 930, a background image of the first scene image 900 is obtained, and a basis is provided for matting the first scene image 900 to obtain the first object 910.

In the above process, the calibration process of the first scene image is taken as an example for illustration. In the embodiments of the present disclosure, a calibration process of the second scene image is consistent with the calibration process of the first scene image, which is not repeated in the embodiments of the present disclosure.

In some embodiments, the above calibration process may be executed before displaying the matting object corresponding to the current terminal; or may be executed by the terminal when it detects that the background image in the scene image changes, that is, in response to detecting a change of a shoot direction of the camera corresponding to the terminal through a sensor, it prompts the need to execute the calibration process, or in response to detecting a change of the background image in the collected scene image, it prompts the need to execute the calibration process.

Step S705: Display a virtual environment picture, the virtual environment picture being a picture for displaying the virtual scene, and the virtual scene including a matting object.

The matting object includes a first object cutout from the first scene image, and a second object cutout from a second scene image, and the second scene image is an image collected by a second camera coupled to a second terminal. Further, the matting object copies movements of the first object and the second object.

In some embodiments, in response to completion of the calibration process of the first object and the second object, the virtual environment picture is displayed, and the server performs matting processing on the first object in the first scene image according to a first background area after calibration of the first object. Similarly, the server performs matting processing on the second object in the second scene image according to a second background area after calibration of the second object, so that the first object and the second object are displayed in the virtual scene.

To sum up, according to the method provided by the embodiments of the present disclosure, in the process of displaying the virtual scene, the first object and the second object are added and displayed in the virtual scene, where the first object and the second object are cutout from the scene image collected by the camera, that is, real people and objects are combined with the virtual scene, so that the real people and objects can interact directly with the virtual scene without interacting with the virtual scene in a form of the virtual object, which improves diversity of interaction between the virtual scene and the user, the player does not need to control the virtual object to interact with the virtual scene, and the interaction efficiency is improved. At the same time, when an object is added to the virtual scene, since the real people and objects are collected directly through the camera to add the object to the virtual scene without performing data modeling for a new object, resource consumption during model data generation is reduced, and resource consumption during model data storage is reduced.

According to the method provided by the embodiment, background areas of the first scene image and the second scene image are determined through a calibration process, so that a basis is provided for subsequent matting of the first scene image to obtain the first object and subsequent matting of the second scene image to obtain the second object, accuracy of obtaining the first object by matting the first scene image is improved, and accuracy of obtaining the second object by matting the second scene image is improved.

Figure 10:
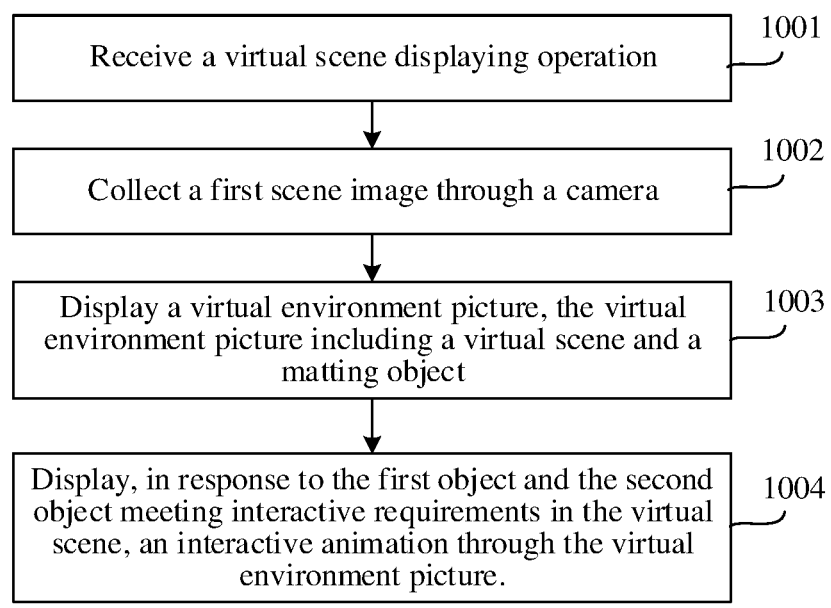
FIG. 10 is a schematic diagram of an interface of an angle adjusting control provided based on the embodiment shown in FIG. 9.

In one embodiment, the first object and the second object can further interact in the virtual scene. FIG. 10 is a flowchart of an interactive method based on a virtual scene provided by another exemplary embodiment of the present disclosure, a situation that the method is applied to a first terminal configured with a camera is taken as an example for illustration, and as shown in FIG. 10, the method includes the following steps:

Step S1001: Receive a virtual scene displaying operation.

In some embodiments, the virtual scene displaying operation refers to an operation that a user indicates to open a virtual scene.

Schematically, a player opens a link of live game on a smart device, at the same time, a camera device is fixed in front of a display, and it is ensured that a specified part or a whole body of the player is within a framing range of the camera.

Step S1002: Collect a first scene image through the camera.

The first scene image includes a first object located within a shoot range of the camera of the first terminal. That is, the first scene image refers to an image collected by the camera configured on the first terminal.

Step S1003: Display a virtual environment picture, the virtual environment picture including a virtual scene and a matting object.

The matting object includes a first object cutout from the first scene image, and a second object cutout from a second scene image, and the second scene image is an image collected by a second camera coupled to a second terminal.

In some embodiments, in response to completion of the calibration process of the first object and the second object, the virtual environment picture is displayed, and the server performs matting processing on the first object in the first scene image according to a first background area after calibration of a first object picture.

Step S1004: Display, in response to the first object and the second object meeting interactive requirements in the virtual scene, an interactive animation through the virtual environment picture.

In some embodiments, in response to actions of the first object and the second object meeting action requirements, the interactive animation is displayed through the virtual environment picture. In response to an action of one of the first object and the second object meeting the action requirements, the interactive animation is displayed; or, in response to the actions of the first object and the second object both meeting the action requirements, the interactive animation is displayed.

The action requirements include at least one of the following conditions:

first, the virtual scene includes an interactive trigger object, and in response to the action of the first object being in contact with the interactive trigger object, an interactive animation between the first object and the virtual scene is displayed through the virtual environment picture; or, in response to the action of the second object being in contact with the interactive trigger object, an interactive animation between the second object and the virtual scene is displayed through the virtual environment picture.

Schematically, an interactive process of the first object is taken as an example for illustration, a target object is displayed in the virtual scene, and the first object is in contact with the target object by executing any action, so as to trigger a display special effect of the first object in the virtual scene. For example, After the first object is in contact with the target object, a special effect of fireworks is displayed around the first object in the virtual scene. That is, an interactive mode between the matting object and virtual items in the virtual scene is provided, interaction diversity when the user realizes display of the object in the virtual scene through the matting object is enriched, and because the matting object may be a real person in the scene image, a sense of interaction between the person and the virtual items may be enhanced.

In the above example, the interactive animation between the first object and the virtual scene is taken as an example for illustration, the embodiment may further be implemented to generate an interactive relationship between the first object and the second object after the first object is in contact with the target object, for example, an animation of the first object delivering flowers to the second object is displayed.

Second, in response to the actions of the first object and the second object matching a preset reference action, an interactive animation corresponding to the preset reference action is displayed through the virtual environment picture.

Schematically, when the actions of the first object and the second object are both open arms, it represents that the first object and the second object match the preset reference action, and an animation of the first object and the second object dancing hand in hand is displayed.

When judging a matching condition of the actions of the first object and the second object with the preset reference action, the first object is taken as an example, bone points are set on the first object through recognition of the first object by the server to represent a bone action of the first object, so as to make the bone action of the first object match the preset reference action to obtain the matching condition of the action of the first object with the preset reference action. Setting of the bone points is realized by calculating a portrait posture to obtain coordinates of limb bone points such as head, hands and feet. That is, by detecting the action of the object, the control of the interactive animation of the matting object in the virtual scene is quickly realized, input operations of the user to the terminal during interaction implementation are reduced, an interactive efficiency is improved, and meanwhile, since the interactive animation is realized according to a matching relationship between the actions among a plurality of objects and the preset reference point action, the sense of interaction among different objects in the virtual scene is enhanced.

Third, in response to the action of the first object matching the preset reference action, an interactive animation between the first object and the virtual scene is displayed through the virtual environment picture; or, in response to the action of the second object matching the preset reference action, an interactive animation between the second object and the virtual scene is displayed through the virtual environment picture.

In some embodiments, the terminal displays tips information corresponding to the above preset reference action on an interface corresponding to the virtual environment picture. In some embodiments, the above tips information may be information in a form of text, images or animations. In some embodiments, the above tips information may be displayed after receiving an action prompt operation; or, the above tips information may be transferred through an action wheel, and the above action wheel includes tips information corresponding to at least two candidate preset reference actions; or, the above tips information may be automatically displayed when it is detected that a similarity between the action corresponding to the matting object and the preset reference action reaches a preset threshold.

Since the first scene image and the second scene image in the embodiments of the present disclosure are two-dimensional images, the first object cutout from the first scene image and the second object cutout from the second scene image are also two-dimensional images correspondingly. Therefore, a display mode of the interactive animation includes at least one the following conditions:

1. Three-dimensional virtual objects corresponding to the first object and the second object are created to execute an interactive action, so as to display the interactive animation.

The three-dimensional virtual objects corresponding to the first object and the second object may be three-dimensional models obtained by adjusting model parts such as hair style, hair color, clothing color, lower clothing type, lower clothing color, shoe type and shoe color, and model parameters based on a preset three-dimensional virtual model and according to image recognition results of the first object and the second object.

2. A head chartlet of the first object is pasted on a head position of the preset three-dimensional virtual model as a model of the first object participating in the interaction, and a head chartlet of the second object is pasted on the head position of the preset three-dimensional virtual model as a model of the second object participating in the interaction.

3. An interactive animation between the first object and the second object in a horizontal plane is displayed, for example, when the actions of the first object and the second object are to extend their hands to both sides of bodies, a dance animation of the first object and the second object holding hands and facing the camera is displayed.

To sum up, according to the method provided by the embodiments of the present disclosure, in the process of displaying the virtual scene, the first object and the second object are added and displayed in the virtual scene, where the first object and the second object are cutout from the scene image collected by the camera, that is, real people and objects are combined with the virtual scene, so that the real people and objects can interact directly with the virtual scene without interacting with the virtual scene in a form of the virtual object, which improves diversity of interaction between the virtual scene and the user, the player does not need to control the virtual object to interact with the virtual scene, and the interaction efficiency is improved. At the same time, when an object is added to the virtual scene, since the real people and objects are collected directly through the camera to add the object to the virtual scene without performing data modeling for a new object, resource consumption during model data generation is reduced, and resource consumption during model data storage is reduced.

According to the method provided by the embodiment, interaction between the first object and the virtual scene, between the second object and the virtual scene and between the first object and the second object is provided, the interactive mode in the virtual scene is increased, and the interaction diversity between the users and the virtual object or between the users is improved.

Figure 11:
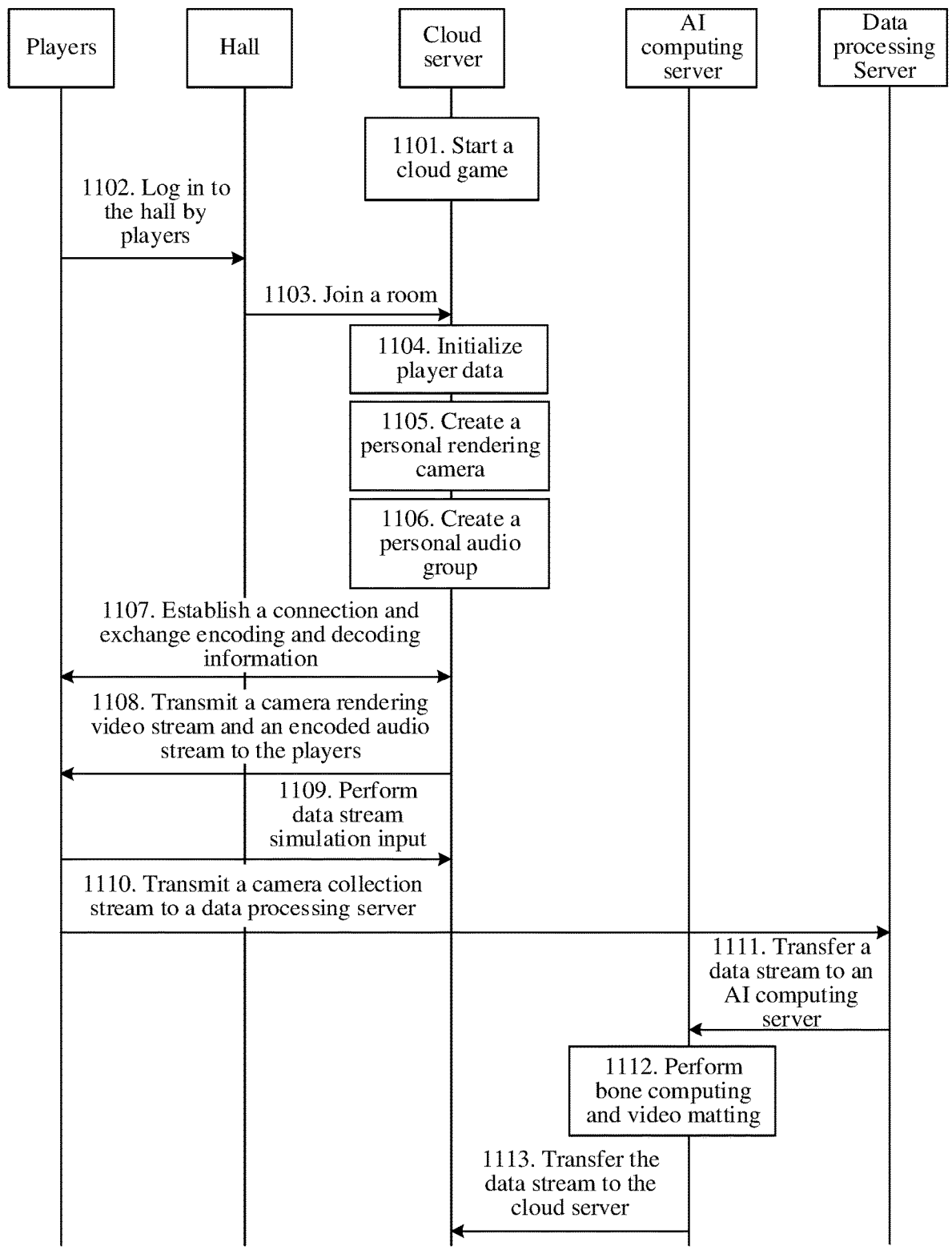
FIG. 11 is an overall flowchart of an interactive process based on a virtual scene provided by an exemplary embodiment of the present disclosure.

Schematically, the interactive method based on the virtual scene provided by the embodiments of the present disclosure being applied to a cloud game is taken as an example. FIG. 11 is an overall flowchart of an interactive process based on a virtual scene provided by an exemplary embodiment of the present disclosure, as shown in FIG. 11, the process includes the following steps:

Step S1101: Start the cloud game by a cloud server.

The cloud game runs in the cloud server, so that a player can access to the cloud server for playing the cloud game.

Step S1102: Log in to a hall by players.

In some embodiments, a plurality of players use an account system to log in to the cloud game hall.

Step S1103: Join a room by the players through the hall.

One cloud game room includes at least one player, in the embodiments of the present disclosure, one cloud game room includes at least two players, and the at least two players may interact with each other.

Step S1104: Initialize player data by the cloud server.

The cloud server first initializes game account data corresponding to the players.

Step S1105: Create a personal rendering camera by the cloud server.

The cloud server creates a unique virtual camera in a game scene of each player, and the cameras are bound to the players one by one, and used for capturing a game picture at a specified angle and transmitting it back to a specified player.

Step S1106: Create a personal audio group by the cloud server.

The above personal audio group is used for providing a voice communication function and audio transmission back-end support for the players in the same game scene.

Step S1107: Establish a connection between the players and the cloud server and exchange encoding and decoding information.

Encoding and decoding are corresponding processes of video processing, the cloud server encodes a game process video and then transmits it to a terminal, and the terminal decodes the encoded video to obtain a decoded video stream for playing; and the terminal collects a video stream through a camera, encodes the video stream collected by the camera, and transmits it to the cloud server for decoding and subsequent processing such as matting.

Step S1108: Transmit, by the cloud server, a camera rendering video stream and an encoded audio stream to the players.

A terminal of a player side decodes the obtained video stream and audio stream to obtain audio and video data that can be rendered and played. In some embodiments, the terminal may transcode the received video stream and audio stream to obtain audio and video data of different playing formats, so as to meet playing demands of different devices.

Step S1109: Perform, by the players, data stream simulation input.

In the cloud game scene realized by the cloud server, the players input control operations through the terminal, the control operations are transmitted into the cloud server, control logics are executed through the cloud server, that is, in the cloud game scene, since the terminal does not need to install an application program for providing a virtual scene, the terminal does not execute an actual control logic, and the terminal transmits a data stream to the cloud server for simulation input.

Step S1110: Transmit, by the players, camera collection streams to a data processing server.

The terminal of the player side transmits image or video data collected by the configured camera to the data processing server in real time, that is, the camera captures the image/video, and the terminal transmits the image/video.

Step S1111: Transfer, by a data processing server, the data streams to an artificial intelligence (AI) computing server.

The data processing server, as a server for data diversion, allocates the data to other dedicated servers (such as the AI computing server) according to processing demands of different data.

Step S1112: Perform, by the AI computing server, bone computing and video matting.

The AI computing server performs matting on each frame of the video stream collected by the terminal camera, removes a background to dig out a portrait, and computes coordinates of limb bone points such as hands, feet and heads according to a posture of the portrait.

Step S1113: Transfer, by the AI computing server, the data streams to the cloud server.

After completing matting, the AI computing server transfers a video stream (picture stream) with a transparent background and bone point coordinate data to the cloud server; after receiving the matted video stream, the cloud server renders it into the game, and realizes functions such as a special effect of touch according to the coordinates of the bone points; the camera in the scene renders a scene content containing the portrait, and transmits it to the player side for display of a game picture; and the terminal of the player side decodes obtained game picture data, and then renders to obtain a virtual environment picture that can be displayed on a display screen.

Figure 12:
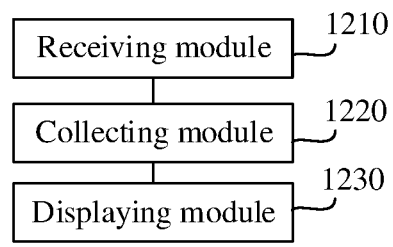
FIG. 12 is a structural block diagram of an interactive apparatus based on a virtual scene provided by an exemplary embodiment of the present disclosure.
Figure 13:
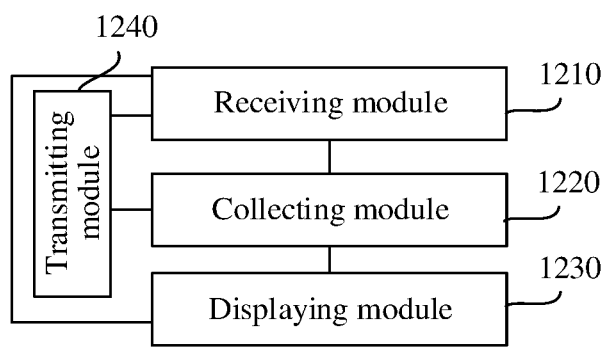
FIG. 13 is a structural block diagram of an interactive apparatus based on a virtual scene provided by another exemplary embodiment of the present disclosure.

FIG. 12 is a structural block diagram of an interactive apparatus based on a virtual scene provided by an exemplary embodiment of the present disclosure. As shown in FIG. 12, the apparatus being applied to a first terminal configured with a camera is taken as an example, and the apparatus includes:

a receiving module 1210, configured to receive a virtual scene displaying operation;

a collecting module 1220, configured to collect a first scene image through the camera, the first scene image including a first object, and the first object being located within a shoot range of the camera of the first terminal; and a displaying module 1230, configured to display a virtual environment picture, the virtual environment picture being a picture for displaying the virtual scene, the virtual scene including a matting object. The matting object copies a movement of the first object cutout from the first scene image and a movement of a second object cutout from a second scene image, where, the second scene image is an image collected by camera coupled to a second terminal.

In one embodiment, the apparatus further includes:

a transmission module 1240, configured to transmit the first scene image to a server.

The receiving module 1210 is further configured to receive picture display data fed back by the server, and the picture display data includes scene data corresponding to the virtual scene and object data corresponding to the matting object; and the displaying module 1230 is further configured to display the virtual environment picture based on the scene data and the object data.

In one embodiment, the object data includes an object display position; and the displaying module 1230 is further configured to display the virtual scene based on the scene data;

the displaying module 1230 is further configured to locate a display position of the matting object corresponding to the virtual scene based on the object display position; and display the matting object at the display position.

In one embodiment, the displaying module 1230 is further configured to display a calibration picture, the calibration picture includes the first scene image, the first scene image includes an indication box and an indication line, the indication box is configured to indicate a location of the first object with a selection box, and the indication line is located at a specified position of the first scene image and segments the first scene image into a first region and a second region; and the collecting module 1220 is further configured to indicate a background part of the first scene image by collecting phase images of the first object moving from a first position to a second position, where the first position is a position of the indication box located in the first region, and the second position is a position of the indication box located in the second region.

In one embodiment, the displaying module 1230 is further configured to display, in response to the first object and the second object meeting interactive requirements in the virtual scene, an interactive animation through the virtual environment picture.

In one embodiment, the displaying module 1230 is further configured to display, in response to actions of the first object and the second object meeting action requirements, the interactive animation through the virtual environment picture.

In one embodiment, the virtual scene further includes an interactive trigger object;

the displaying module 1230 is further configured to display, in response to the action of the first object being in contact with the interactive trigger object, an interactive animation between the first object and the virtual scene through the virtual environment picture;

or the displaying module 1230 is further configured to display, in response to the action of the second object being in contact with the interactive trigger object, an interactive animation between the second object and the virtual scene through the virtual environment picture.

In one embodiment, the displaying module 1230 is further configured to display, in response to the actions of the first object and the second object matching a preset reference action, an interactive animation corresponding to the preset reference action through the virtual environment picture.

To sum up, according to the apparatus provided by the embodiments of the present disclosure, in the process of displaying the virtual scene, the first object and the second object are added and displayed in the virtual scene, where the first object and the second object are cutout from the scene image collected by the camera, that is, real people and objects are combined with the virtual scene, so that the real people and objects can interact directly with the virtual scene without interacting with the virtual scene in a form of the virtual object, which improves diversity of interaction between the virtual scene and the user, the player does not need to control the virtual object to interact with the virtual scene, and the interaction efficiency is improved. At the same time, when an object is added to the virtual scene, since the real people and objects are collected directly through the camera to add the object to the virtual scene without performing data modeling for a new object, resource consumption during model data generation is reduced, and resource consumption during model data storage is reduced.

It needs to be explained that, according to the interactive apparatus based on the virtual scene provided by the above embodiments, dividing of the above functional modules are only for exemplary illustration. In actual applications, the above functions may be allocated to and completed by different functional modules according to needs, that is, an internal structure of a device is divided to different functional modules to complete all or some of the above described functions. In addition, the interactive apparatus based on the virtual scene provided in the above embodiment and the interactive method embodiment based on the virtual scene belong to the same conception, and a specific implementation process refers to the details in the method embodiments, which will not be repeated here.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 14:
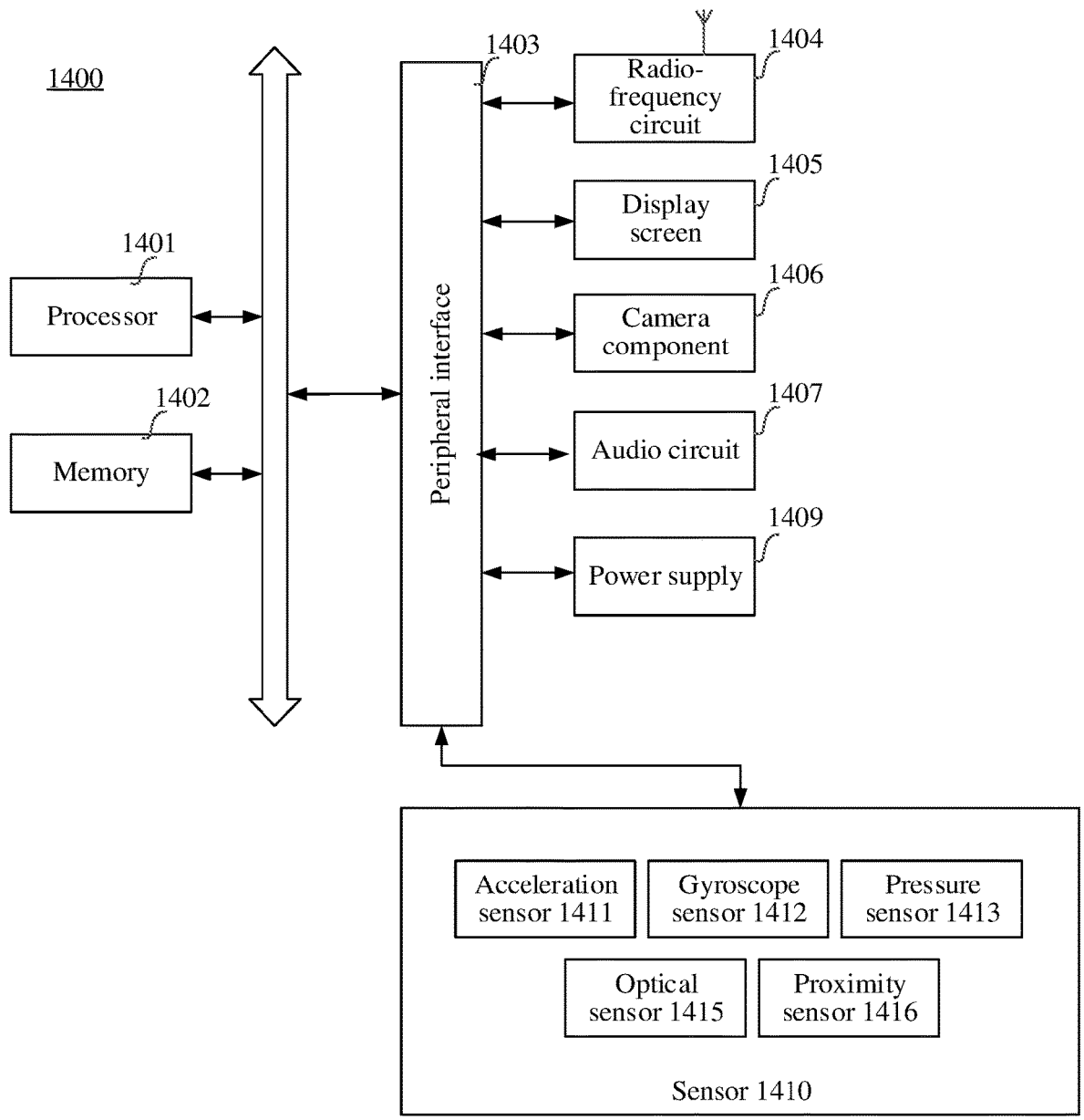
FIG. 14 is a structural block diagram of a terminal provided by an exemplary embodiment of the present disclosure.

FIG. 14 shows a structural block diagram of a terminal 1400 provided by an exemplary embodiment of the present disclosure.

Usually, the terminal 1400 includes: a processor 1401 and a memory 1402.

The processor 1401 may include one or more processing cores, such as a 4-core processor or an 8-core processor.

The memory 1402 may include one or more computer-readable storage media. The computer-readable storage medium may be non-transitory. In some embodiments, the non-transitory computer-readable storage medium in the memory 1402 is configured to store at least one instruction, and the at least one instruction is used for being executed by the processor 1401 to implement the interactive method based on the virtual scene provided in the method embodiments of the present disclosure.

In some embodiments, the terminal 1400 may further include: a peripheral interface 1403 and at least one peripheral device. The processor 1401, the memory 1402, and the peripheral interface 1403 may be connected through a bus or a signal line. Each peripheral device may be connected to the peripheral interface 1403 through a bus, a signal line, or a circuit board. Specifically, the peripheral device includes: at least one of a radio-frequency circuit 1404, a display screen 1405, a camera component 1406, an audio circuit 1407 or a power source 1409.

The peripheral interface 1403 may be configured to connect the at least one peripheral device related to input/output (I/O) to the processor 1401 and the memory 1402.

The radio-frequency circuit 1404 is configured to receive and transmit a radio frequency (RF) signal, also referred to as an electromagnetic signal. The radio-frequency circuit 1404 communicates with a communication network and other communication devices through the electromagnetic signal.

The display screen 1405 is configured to display a user interface (UI). The UI may include a graph, text, an icon, a video, and any combination thereof.

The camera component 1406 is configured to collect images or videos.

The audio circuit 1407 may include a microphone and a speaker.

The power source 1409 is configured to supply power to each component in the terminal 1400.

In some embodiments, the terminal 1400 further includes one or more sensors 1410. The one or more sensors 1410 include but not limited to: an acceleration sensor 1411, a gyroscope sensor 1412, a pressure sensor 1413, an optical sensor 1415, and a proximity sensor 1416.

A person skilled in the art may understand that the structure shown in FIG. 14 constitutes no limitation on the terminal 1400, and the terminal may include more or fewer components than those shown in the figure, or some components may be combined, or a different component deployment may be used.

In some embodiments, the computer-readable storage medium may include: a read only memory (ROM), a random access memory (RAM), a solid state drive (SSD), an optical disc, or the like. The RAM may include a resistance random access memory (ReRAM) and a dynamic random access memory (DRAM). The sequence numbers of the above embodiments of the present disclosure are merely for description, but do not imply the preference for the embodiments.

What is claimed is:

1. An interactive method based on a virtual scene, executed by a first terminal logged in with a target account, and comprising:

receiving a virtual scene displaying operation;

collecting a first scene image through a first camera coupled to the first terminal, the first scene image comprising a first object, and the first object being a real world object located within a shoot range of the first camera;

displaying a virtual environment picture showing the virtual scene, the virtual scene comprising a matting object, wherein the matting object copies a movement of the first object cutout from the first scene image and a movement of a second object cutout from a second scene image, and the second scene image is an image collected by a second camera coupled to a second terminal;

receiving a viewing angle adjusting operation; and in response to the target account has control access to a plurality of camera models, adjusting a first observation angle for observing the virtual scene and the matting object to a second observation angle based on the viewing angle adjusting operation, and displaying, on the first terminal, the virtual scene at the second observation angle, the first observation angle corresponding to a first camera model in the virtual scene, and the second observation angle corresponding to a second camera model in the virtual scene.

2. The method according to claim 1, wherein the displaying a virtual environment picture, comprises:
  transmitting the first scene image to a server;
  receiving picture display data fed back by the server, the picture display data comprising scene data corresponding to the virtual scene and object data corresponding to the matting object; and
  displaying the virtual environment picture based on the scene data and the object data.

3. The method according to claim 2, wherein the object data comprises an object display position; and
  the displaying the virtual environment picture based on the scene data and the object data, comprises:
  displaying the virtual scene based on the scene data; and
  displaying the matting object at the object display position in the virtual scene.

4. The method according to claim 1, wherein the method further comprises:
  displaying a calibration picture, the calibration picture comprising the first scene image, the first scene image comprising an indication box and an indication line, the indication box being configured to indicate a location of the first object with a selection box, and the indication line being located at a specified position of the first scene image and dividing the first scene image into a first region and a second region; and
  indicating a background part of the first scene image by collecting phase images of the first object moving from a first position to a second position, the first position being a position of the indication box located in the first region, and the second position being a position of the indication box located in the second region.

5. The method according to claim 1, wherein the method further comprises:
  displaying, in response to the first object and the second object meeting interactive requirements in the virtual scene, an interactive animation through the virtual environment picture.

6. The method according to claim 5, wherein the displaying, in response to the first object and the second object meeting interactive requirements in the virtual scene, an interactive animation through the virtual environment picture, comprises:
  displaying, in response to actions of the first object and the second object meeting action requirements, the interactive animation through the virtual environment picture.

7. The method according to claim 6, wherein the virtual scene further comprises an interactive trigger object; and
  the displaying, in response to actions of the first object and the second object meeting action requirements, the interactive animation through the virtual environment picture, comprises:
  displaying, in response to the action of the first object being in contact with the interactive trigger object, an interactive animation between the first object and the virtual scene through the virtual environment picture; or
  displaying, in response to the action of the second object being in contact with the interactive trigger object, an interactive animation between the second object and the virtual scene through the virtual environment picture.

8. The method according to claim 6, wherein the displaying, in response to actions of the first object and the second object meeting action requirements, the interactive animation through the virtual environment picture, comprises:
  displaying, in response to the actions of the first object and the second object matching a preset reference action, an interactive animation corresponding to the preset reference action through the virtual environment picture.

9. The method according to claim 1, wherein the adjusting a first observation angle for observing the virtual scene and the matting object to a second observation angle based on the viewing angle adjusting operation, comprises:
  determining a camera model corresponding to the target account in the virtual scene, the camera model at least comprising the first camera model and the second camera model, and the first camera model being a camera model currently used for observing the virtual scene; and
  switching the first camera model for observing the virtual scene to the second camera model based on the viewing angle adjusting operation, and observing and rendering the virtual scene at the second observation angle.

10. An interactive apparatus based on a virtual scene, comprising a processor and a memory, the memory storing at least one program, and the at least one program being loaded and executed by the processor to implement:
  receiving a virtual scene displaying operation;
  collecting a first scene image through a first camera coupled to a first terminal logged in with a target account, the first scene image comprising a first object, and the first object being located within a shoot range of the first camera;
  displaying a virtual environment picture showing the virtual scene, the virtual scene comprising a matting object, wherein the matting object copies a movement of the first object cutout from the first scene image and a movement of a second object cutout from a second scene image, and the second scene image being an image collected by a second camera coupled to a second terminal;
  receiving a viewing angle adjusting operation; and
  in response to the target account has control access to a plurality of camera models, adjusting a first observation angle for observing the virtual scene and the matting object to a second observation angle based on the viewing angle adjusting operation, and displaying, on the first terminal, the virtual scene at the second observation angle, the first observation angle corresponding to a first camera model in the virtual scene, and the second observation angle corresponding to a second camera model in the virtual scene.

11. The apparatus according to claim 10, wherein the displaying a virtual environment picture, comprises:
  transmitting the first scene image to a server;
  receiving picture display data fed back by the server, the picture display data comprising scene data corresponding to the virtual scene and object data corresponding to the matting object; and
  displaying the virtual environment picture based on the scene data and the object data.

12. The apparatus according to claim 11, wherein the object data comprises an object display position; and
  the displaying the virtual environment picture based on the scene data and the object data, comprises:
  displaying the virtual scene based on the scene data; and
  displaying the matting object at the object display position in the virtual scene.

13. The apparatus according to claim 10, wherein the processor is further configured to implement:

displaying a calibration picture, the calibration picture comprising the first scene image, the first scene image comprising an indication box and an indication line, the indication box being configured to indicate a location of the first object with a selection box, and the indication line being located at a specified position of the first scene image and dividing the first scene image into a first region and a second region; and indicating a background part of the first scene image by collecting phase images of the first object moving from a first position to a second position, the first position being a position of the indication box located in the first region, and the second position being a position of the indication box located in the second region.

14. The apparatus according to claim 10, wherein the processor is further configured to implement:

displaying, in response to the first object and the second object meeting interactive requirements in the virtual scene, an interactive animation through the virtual environment picture.

15. The apparatus according to claim 14, wherein the displaying, in response to the first object and the second object meeting interactive requirements in the virtual scene, an interactive animation through the virtual environment picture, comprises:

displaying, in response to actions of the first object and the second object meeting action requirements, the interactive animation through the virtual environment picture.

16. The apparatus according to claim 15, wherein the virtual scene further comprises an interactive trigger object; and the displaying, in response to actions of the first object and the second object meeting action requirements, the interactive animation through the virtual environment picture, comprises:

displaying, in response to the action of the first object being in contact with the interactive trigger object, an interactive animation between the first object and the virtual scene through the virtual environment picture; or displaying, in response to the action of the second object being in contact with the interactive trigger object, an interactive animation between the second object and the virtual scene through the virtual environment picture.

17. The apparatus according to claim 15, wherein the displaying, in response to actions of the first object and the second object meeting action requirements, the interactive animation through the virtual environment picture, comprises:

displaying, in response to the actions of the first object and the second object matching a preset reference action, an interactive animation corresponding to the preset reference action through the virtual environment picture.

18. A non-transitory computer-readable storage medium, storing at least one program, the at least one program being loaded and executed by a processor of a first terminal to implement:

receiving a virtual scene displaying operation;

collecting a first scene image through a first camera coupled to the first terminal logged in with a target account, the first scene image comprising a first object, and the first object being located within a shoot range of the first camera;

displaying a virtual environment picture showing a virtual scene, the virtual scene comprising a matting object, wherein the matting object copies a movement of the first object cutout from the first scene image and a movement of a second object cutout from a second scene image, and the second scene image being an image collected by a second camera coupled to a second terminal;

receiving a viewing angle adjusting operation; and in response to the target account has control access to a plurality of camera models, adjusting a first observation angle for observing the virtual scene and the matting object to a second observation angle based on the viewing angle adjusting operation, and displaying, on the first terminal, the virtual scene at the second observation angle, the first observation angle corresponding to a first camera model in the virtual scene, and the second observation angle corresponding to a second camera model in the virtual scene.

19. The method according to claim 1, further comprising:

in response to the target account has control access to a single camera model, adjusting, by the first terminal, at least one of an observation position or an observation focal length corresponding to a third camera model in the virtual scene.

* * * * *